(No Model.)
D. PARRY.
CHAIN FOR MORTISING MACHINES.
No. 593,684. Patented Nov. 16, 1897.
Fig.1. Fig.2. Fig.3.
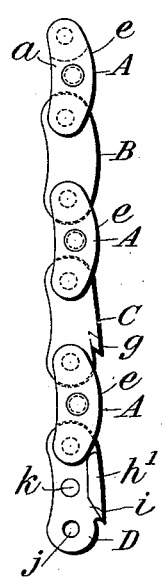
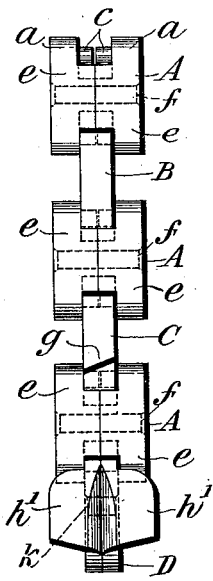
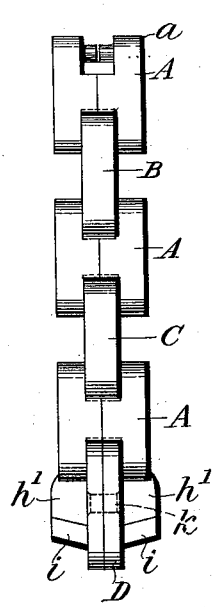
Fig.4. Fig.5. Fig.6. Fig.7.
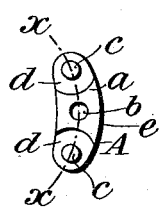
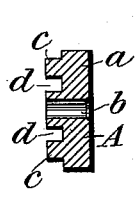
Fig.8. Fig.9. Fig.10.
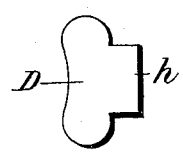
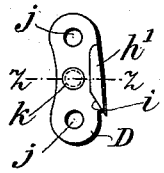
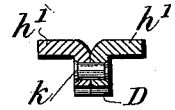
WITNESSES. INVENTOR.
Denis Parry
by Foster Freeman
attorneys
THE NORRIS PETERS CO., PHOTO-LITHO., WASHINGTON, D. C.

UNITED STATES PATENT OFFICE.

DENIS PARRY, OF LONDON, ENGLAND, ASSIGNOR TO JOHN MAGRATH KELLY, OF SAME PLACE.

CHAIN FOR MORTISING-MACHINES.

SPECIFICATION forming part of Letters Patent No. 593,684, dated November 16, 1897.

Application filed March 10, 1897. Serial No. 626,800. (No model.)

*To all whom it may concern:*

Be it known that I, DENIS PARRY, a subject of Her Majesty the Queen of Great Britain, residing at Herne Hill, London, in the county of Surrey, England, have invented a certain new and useful Improvement in Chains for Mortising-Machines, of which the following is a specification.

My invention relates to a certain new and useful improvement in chains for chain-mortising machines, the class of chain being that more particularly described in the specification to Letters Patent of the United States, dated the 24th day of April, 1894, and numbered 518,646, the object of my present invention being to simplify the manufacture and construction of such chains, whereby not only may they be cheaply produced, but may be also readily assembled or put together and taken apart for repairs or other purposes and by which also a smaller mortise may be made.

In the accompanying drawings, Figure 1 is a side view of a sufficient portion of a chain to illustrate my invention. Fig. 2 is a front view of same. Fig. 3 is a rear view. Fig. 4 is a side view of one part of a connecting-link. Fig. 5 is a section of same on line $xx$, Fig. 4. Fig. 6 is a side elevation of a single-toothed cutting-link. Fig. 7 is a section of same on line $yy$, Fig. 6. Fig. 8 is a side view of a part of a divided cutter during one stage of its manufacture. Fig. 9 is a side view of the completed link, and Fig. 10 is a cross-section on line $zz$ of Fig. 9.

The chain may consist of various links and arrangements of same. In Fig. 1 is shown one arrangement. The chain here consists of a divided connecting-link A, a plain solid link B, another divided link A, a solid cutter-link C, a further link A, and a divided cutter-link D. The link A is formed in halves, as shown in detail in Figs. 4 and 5, each half consisting of a body portion $a$, through which is a central opening $b$, and two studs $c\,c$, which are formed by cutting or milling away the metal, so as to leave the space $d$ around same, the stud being thus produced from the solid metal of the body portion. This body portion is preferably curved or humped, as shown. The hump $e$ thus present on the face is arranged to be at about the same level as the cutters on the preceding links and acts as a fence or guard for the cutter of the link following just behind in the course of the travel of the chain and renders unnecessary the employment of the special-shaped fence or guard described in the specification before referred to. This face acts like the shoulder at the mouth of a plane and prevents the cutter entering too deep into the wood. The fence is more particularly desirable for use in front of the wide-faced cutter hereinafter described, but it also serves the same purpose in front of the narrow cutter, such as C. When the two parts of the links are placed together, the studs $c\,c$ abut and form a pin or pivot for the link next in order. The two parts are then secured together by a central pin or rivet $f$, which passes through the hole $b$. By driving out this pin the link may be at once divided and the chain broken or opened.

By forming the studs out of the solid metal instead of using a loose pin I am enabled to employ a smaller link, as with a loose pin a certain thickness must be allowed for the wall around the opening which would in the ordinary course be formed at each end of the link, while with a stud formed as described the thickness may be very much less and the link may thus be reduced in size, with the result that the chain will travel around a suitable pulley or roller, and thus a mortise of a smaller size may be made.

The plain link B may be simply a piece or length of metal of any suitable shape, which may be used to space out the chain as desired.

The single cutter-link C has an angular tooth $g$ on its face and holes $h\,h$ at its ends, with which engage the studs of the divided links A. The tooth $g$ relieves the wide-faced cutter D (hereinafter described) of some of the work, and also cuts away a portion of the material in the center, which portion the construction of the cutter D prevents it from attacking. The cutter D is preferably produced from sheet-steel of suitable thickness, a piece being stamped out, as shown in Fig. 8, having a wing or projection $h$, which is bent down by a subsequent process to form a flange or cutter-blade $h'$ and sharpened on the line $i$, the link so formed being punched with the holes *j j* for the studs *c* of the connecting-links and with a central hole *k* for a pin or rivet which connects the halves. This constitutes a cheap and economical method of forming the T-shaped cutter described in the specification above referred to, as it is produced, with the exception of the cutting edge, entirely by stamping.

What I claim is—

1. In a chain for chain-mortising machines, a link composed of parts each part having a stud at either end, formed out of the metal of the part, and projecting inwardly, recesses or gaps around same, and a hole for a pin or rivet through the main or body portion, the parts being so formed that when put together the studs of one part abut against the studs of the other as do also the main parts forming the body portion, substantially as described.

2. In a chain for chain-mortising machines, a link composed of parts each part having a curved or humped face and a stud at either end at right angles to the face, said stud being formed out of the metal of the parts and projecting inwardly, recesses or gaps around same and a hole for a pin or rivet through the main or body portion, the studs and body portion of one part being adapted to abut against those of the other, and a link provided with a cutter on its face with which link the studs of the divided link are adapted to engage, the curved face of the latter acting as a fence or guard for the cutter, substantially as described.

3. In a chain for chain-mortising machines, a T-shaped cutter-link composed of two pieces of metal having flanges at right angles to same sharpened to form the cutters, the body portions of said pieces abutting and having holes at either end for connecting the link up in the chain, a central hole, and a pin or rivet secured in same to hold the two parts firmly together, substantially as described.

In testimony whereof I have hereunto set my hand in the presence of two subscribing witnesses.

DENIS PARRY.

Witnesses:
ALLEN PARRY JONES,
PHILIP M. JUSTICE.